United States Patent Office 3,106,580
Patented Oct. 8, 1963

3,106,580
HALOGENATED OXO SPIRO INSECTICIDAL
COMPOUNDS
Donald D. Phillips, Modesto, Calif., assignor to Shell Oil
Company, New York, N.Y., a corporation of Delaware
No Drawing. Filed May 23, 1960, Ser. No. 30,737
2 Claims. (Cl. 260—586)

This invention relates to new compositions of matter possessing high toxicity to insects and low toxicity to mammals.

More specifically, this invention relates to a group of polyhalopolycyclic oxo spiro hydrocarbon compounds and to insecticidal compositions containing these compounds.

In order to be practical and commercially useful an insecticide must meet various requirements. It must of course exhibit a high degree of toxicity toward insects and not be prohibitively expensive. It must lend itself to the various methods of dissemination in insect habitats and then must possess some reasonable amount of residual insecticidal activity. It must remain chemically stable during storage and use. Other requirements for specific purposes may also be added to the foregoing.

Regardless of an insecticide's ability to meet some or all of these requirements, a commercial insecticide for many purposes must be relatively non-toxic to mammals or its employment will be severely limited if not entirely unsuitable. It is obvious that a composition which kills domestic animals and perhaps humans as efficiently as it does insects has little practical value as an insecticide under some circumstances.

Many of the halogenated hydrocarbons that have been discovered have had the serious disadvantage of exhibiting excessive mammalian toxicity and have required special handling and careful or limited use. The compounds of the present invention have substantially overcome this drawback and may therefore be used relatively freely despite the possibility of subsequent contact with mammals.

These new compounds also possess the other prerequisites of a commercial insecticide. For example, they are highly stable and retain their toxicity toward insects for long periods of time without loss of their halogen atoms. They also show exceptionally high residual insecticidal activity.

It is therefore a principal object of this invention to provide a group of insecticides that are simultaneously highly toxic to insects while being relatively non-toxic to mammals.

Another object of this invention is to provide a group of insecticidally active organic compounds which are chemically stable under ordinary conditions of use, particularly in regard to their halogen substituents.

Another object is the production of a group of stable, insecticidally active compounds with high degrees of residual insecticidal activity.

A still further object of this invention is to provide means for the production of these new and valuable insect toxicants.

Other objects, features, capabilities and advantages provided by this invention will later appear.

According to this invention, the new compounds are polyhalopolycyclic oxo spiro hydrocarbons represented by the planar structural formula

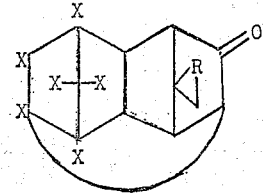

wherein X is a halogen atom and R is an alkylene radical. It is preferred that X is a middle halogen atom, i.e., a bromine or chlorine atom, and is most preferably a chlorine atom. It is also preferred that the alkylene radical R which forms part of a cycloalkyl ring have from 1 to 10 carbon atoms. It is to be particularly noted that this cycloalkyl ring is attached to the remainder of the molecule through a spiro linkage with a methano bridge.

The present compounds may therefore be described as 1',8',9',10',11',11' - hexahalospiro[cycloalkane - 1,12'-pentacyclo(6.2.1.1$^{3,6}$.0$^{2,7}$.0$^{5,9}$)dodecan] - 4 - ones, preferably wherein the halogen atoms have atomic numbers lying between 16 and 36, the most preferred halo-substituted compounds being 1',8',9',10',11',11' - hexachlorospiro[cycloalkane - 1,12' - pentacyclo(6.2.1.1$^{3,6}$.0$^{2,7}$.0$^{5,9}$) dodecan]-4-ones. Of most interest are those compounds of this latter group wherein the cycloalkane ring has from 3 to 12 carbon atoms.

Specific examples of compounds within the scope of this invention include among others: 1',8',9',10',11',11'-hexachlorospiro[cyclopropane - 1,12' - pentacyclo(6.2.1.1$^{3,6}$. 0$^{2,7}$.0$^{5,9}$)dodecan]-4-one; 1',8',9',10',11',11' - hexabromospiro[cyclobutane-1,12' - pentacyclo-(6.2.1.1$^{3,6}$.0$^{2,7}$.0$^{5,9}$) dodecan] - 4 - one; 1',8',9',10',11',11'-hexabromospiro [cyclopentane-1,12' - pentacyclo(6.2.1.1$^{3,6}$.0$^{2,7}$.0$^{5,9}$)dodecan]-4-one; 1',8',9',10',11',11' - hexachlorospiro[cyclopentane-1,12' - pentacyclo(6.2.1.1$^{3,6}$.0$^{2,7}$.0$^{5,9}$)dodecane]-4-one; 1',8',9'-trichloro-10',11',11' - tribromospiro]cyclohexane-1,12'-pentacyclo-(6.2.1.1$^{3,6}$.0$^{2,7}$.0$^{5,9}$)dodecan] - 4-one; 1',8',9',10'-tetrachloro-11',11'-dibromospiro[3-ethylcyclononane-1,12' - pentacyclo - (6.2.1.1$^{3,6}$.0$^{2,7}$.0$^{5,9}$)dodecan]-4-one.

These new and remarkable compounds can in general be prepared by a diversity of means. While the present invention should in no sense be limited by any particular means, it is preferred to prepare these novel compounds by the oxidation of the corresponding halogenated polycyclic spiro dienes.

The corresponding dienes may be prepared by reacting 1,2,3,4,7,7-hexahalobicyclo(2.2.1)-2,5-heptadiene with a spiro[2,4-cyclopentadiene - 1,1' - cycloalkane] by heating the reactants in liquid phase at a temperature and for a time sufficient for appreciable product formation.

It will be apparent to those well versed in the art that any desired corresponding diene of a compound of this invention may be prepared by the selection of proper reactants. Thus, the method of preparing the corresponding diene of the preferred chlorine substituted compounds comprises reacting 1,2,3,4,7,7 - hexachlorobicyclo(2.2.1)-2,5-heptadiene with a spiro[2,4-cyclopentadiene - 1,1'-cycloalkane] by heating the reactants in liquid phase. Similarly, corresponding dienes of compounds of this invention having any particular cycloalkane substituent on the methano bridge are prepared by employing as a starting reactant the spiro compound consisting of a 2,4-cyclopentadiene and the particular cycloalkane desired as the substituent on the product.

In general, the conditions employed in the Diels-Alder diene synthesis will most readily produce these dienes. In the majority of cases, the reactions proceed rapidly and well at temperatures between 80–150° C. and at atmospheric pressure or at pressures which are only slightly above atmospheric pressure over a three to twenty-four hour time period.

These corresponding dienes can also be prepared in the presence of suitable solvents. The rate of reaction will be highest if the solvent chosen has a boiling point above 80° C. For this purpose, chlorobenzene, xylene, dibutyl ether, etc. can advantageously be chosen. Solvents such as benzene, toluene, butyl alcohol, and dioxane can also be used but an increase in reaction time will then be necessary.

In general, the synthesis is carried out in approximately equimolar quantities of reactants. It has been found to be advantageous to use a small excess of the halogenated heptadiene reactant.

The 1′,8′,9′,10′,11′,11′ - hexahalospiro[cycloalkane - 1, 12′-pentacyclo(6.2.1.1$^{3,6}$.0$^{2,7}$.0$^{5,9}$)dodecan]-4-ones of this invention may then be formed from these dienes by the method which comprises oxidizing a 5,6,7,8,9,9-hexahalo-1,4,4a,5,8,8a - hexahydro- 1,4(1′,1′) - cycloalkano - endo, endo-5,8-methanonaphthalene with an organic peracid in the presence of a minor amount of a mineral acid. For example, the preferred chloro-substituted compounds are prepared by oxidizing a 5,6,7,8,9,9,-hexachloro-1,4,4a,5,8, 8a - hexahydro - 1,4(1′,1) - cycloalkano - endo,endo-5,8-methanonaphthalene with an organic peracid in the presence of a minor amount of a mineral acid. Similarly, a compound of this invention with any particular cycloalkyl ring is obtained from the corresponding diene.

The oxidation reaction can readily be accomplished with these compounds by standard procedures for this reaction utilizing various oxidizing agents. It is preferred to use an organic peracid such as perbenzoic, monoperphthalic, or peracetic. Peracetic is particularly preferred since it may be conveniently formed in situ from acetic anhydride and hydrogen peroxide. A minor amount of a mineral acid is required to insure oxidation to the ketone rather than the corresponding epoxide. While many of the inorganic acids such as HCl, HNO$_3$, the phosphorus acids, and the sulfur acids may be used for this purpose, it is preferred to use sulfuric acid. Suitable inert solvents such as benzene, chloroform, dioxane, and the like may be used if desired.

The details of the method of preparation are best described by reference to the following examples. It is to be understood that these examples are offered for illustrative purposes only and are not to be construed as limiting the present invention.

*Example I*

Over a period of ¾ hour, 22 grams (0.24 mole) of spiro[4.2]-1,3-heptadiene ($n_D^{25}$ 1.5073) was added to 84 grams (0.28 mole) of 1,2,3,4,7,7-hexachlorobicyclo(2.2.1)-2,5-heptadiene (B.P. 113–114° C. at 1.8 mm.) with stirring while maintaining the temperature at 80–90° C. The temperature was then slowly raised to 140° C. over a 5-hour period. The reaction mixture changed from yellow to red to brown in color.

The reaction mixture solidified when cooled to room temperature. The brown mass was triturated with cold hexane and filtered to afford 53 grams of tan crystals, M.P. 165–169° C. Yield=56%.

Ten grams of this product was recrystallized from hexane (about 12 ml./g.) and identified as 5,6,7,8,9,9-hexachloro - 1,4,4a,5,8,8a - hexahydro - 1,4(1′,1′) - cyclopropano-endo,endo-5,8-methanonaphthalene with a melting point of 169–170° C. Identification was based on infrared analysis and the following elemental analysis:

Cl$_6$C$_{14}$H$_{10}$—Calculated: C, 43.0; H, 2.6; Cl, 54.4. Found: C, 42.8; H, 2.6; Cl, 54.4.

The endo,endo structure believed to be possessed by this type of a molecule is described in detail in U.S. 2,717,851, patented September 13, 1955.

*Example II*

To 45 ml. of acetic anhydride containing three drops of concentrated H$_2$SO$_4$ was added dropwise, with cooling, 9.5 ml. (0.11 mole) of 35% H$_2$O$_2$. The solution was allowed to rise to 20° C. and, over a period of 5 minutes, there was added 10.5 grams (0.027 mole) of the product prepared in Example I in 60 ml. of benzene. The mixture was allowed to stir at 25° C. for one hour and then at 50° C. for 24 hours.

The resulting pale-yellow solution was diluted with 100 ml. of H$_2$O and 100 ml. of ether. The organic layer was washed successively with water, sodium carbonate solution, water, and finally a saturated salt solution. The solvent was evaporated to afford 10 grams of crystals.

The solid was recrystallized from acetone-hexane to afford 9.4 grams of colorless cubes, M.P. 179–183° C., with softening beginning about 154° C. There were two types of crystals apparent in the solid and these were separated mechanically into transparent and translucent crops, each of which was crystallized from acetone.

The translucent crystals gave 1.5 grams of stout rhombs, M.P. 186–187° C., and were submitted for analysis. Infrared analysis showed it to be a ketone with no presence of epoxide. Elemental analysis confirmed that the expected product was in fact 1′,8′,9′,10′,11′,11′-hexachlorospiro[cyclopropane - 1,12′ - pentacyclo(6.2.1.1$^{3,6}$.0$^{2,7}$.0$^{4,10}$)dodecan]-4-one.

OCl$_6$C$_{14}$H$_{10}$—Calculated: C, 41.32; H, 2.48; Cl, 52.28. Found: C, 40.4; H, 2.4; Cl, 53.0, 53.1.

By increasing the time and temperature of the reaction, increased yields have been obtained. By repeating the above steps and running the reaction for 40 hours at 75° C., a 33% yield was obtained.

In another trial using perbenzoic acid at 40° C. for three days, a total yield of 67% of the above product was obtained.

These new products of my invention possess, as has already been noted, great practical usefulness as insect toxicants. They exhibit a high degree of toxicity to a wide variety of insects. The compound prepared in Example II was taken as illustrative of the compounds of this invention and put through a series of tests to demonstrate its high level of toxicity to insects. The results are shown in Example III.

*Example III*

The compound prepared in Example II was diluted with No. 10 base oil, and sprayed on the common housefly, *Musca domestica*. After 20 hours, the concentration of the compound in grams per 100 ml. of solvent required to cause approximately 50 percent mortality of the test insect—i.e., the LD–50 concentration, was 0.016.

In tests against *Anopheles albimanus* larvae, the compound of Example II also proved itself to be highly toxic.

On the other hand the compounds of this invention, as exemplified by the compound of Example II, have demonstrated an extremely low toxicity to mammals and find commercial uses not otherwise open to them. Illustrative of the minimal adverse effect on mammals is the high dosage required to achieve an LD–50 in mice and rats.

*Example IV*

The compound of Example II was administered to mice and rats and the quantity in mg./kg. required to achieve an LD–50 was recorded. It was determined that the value for mice was 130 and for rats it was 91. The significance of these values will be appreciated when compared to the LD–50 of endrin for which the values are 12 and 25 for mice and rats, respectively.

The new compositions of matter of this invention are soluble in all of the common organic solvents and they can be utilized as insect toxicants in all the ways customary in the art. Thus they can be dissolved in the insecticide base oils normally employed and the resulting solutions sprayed or otherwise employed in the usual fashion. They can also be combined with finely divided carriers to produce wettable and non-wettable insecticidal dusts, they can be used in the presence of emulsifying agents, with water, and with water and oils to form insecticidal emulsions. They can also be incorporated in aerosol compositions, and, in general, they can be used either as the sole insect toxicant in an insecticidal composition or in combination with other insecticides in order to obtain combination properties and other desirable characteristics.

The unusual properties and great stability of these new compounds make them particularly suitable in a number of less common but highly desirable applications for insecticidal materials. Thus, they can be added to paints, lacquers, varnishes, and polishing waxes, which, after application, will give surfaces possessing a high order of insect toxicity. They can be added to paper products of all types either by suitable impregnation of the finished paper materials, or by incorporation during the manufacturing process. Similarly they can be added to tackifiers, plasticizers, printing inks, rubber products, etc., in order to provide finished objects possessing inherent toxicity to insect life and resistance to insect attack. They can also be added to various types of plastics and plastic sheetings in order to obtain packaging and wrapping materials themselves resistant to insect attack and able to protect objects packed in them from such attack. Because of their high resistance to the action of alkali, these new compositions can be incorporated into white washes and other similar surface coatings. Those skilled in the art will, of course, recognize that many other similar uses for these unique compounds are possible, all of which follow from the special combination of valuable properties possessed by them.

I claim as my invention:

1. A $1',8',9',10',11',11'$-hexahalospiro[cyclopropane-1, $12'$ - pentacyclo$(6.2.1.1^{3,6}.0^{2,7}.0^{5,9})$dodecan]-4-one, the halo being halogen of atomic number between 16 and 36.

2. $1',8',9',10',11',11'$ - hexachlorospiro[cyclopropane-1, $12'$-pentacyclo$(6.2.1.1^{3,6}.0^{2,7}.0^{5,9})$dodecan]-4-one.

References Cited in the file of this patent

UNITED STATES PATENTS

| | | |
|---|---|---|
| 1,946,115 | Schoeller et al. | Feb. 6, 1934 |
| 2,475,288 | Ladd | July 5, 1949 |
| 2,584,139 | Lidov et al. | Feb. 5, 1952 |
| 2,717,851 | Lidov | Sept. 13, 1955 |
| 2,730,548 | Bluestone et al. | Jan. 10, 1956 |
| 2,768,178 | Bellin | Oct. 23, 1956 |
| 2,829,082 | O'Brien | Apr. 1, 1958 |